No. 12,009. Reissued July 15, 1902.

C. H. BENTON.

ENGINE.

(Application filed May 5, 1902.)

2 Sheets—Sheet 1.

WITNESSES:

Wm. A. Skinkle

A. Emerkel

INVENTOR:

C. H. Benton by his attorney,

J. B. Fay

No. 12,009. Reissued July 15, 1902.

C. H. BENTON.

ENGINE.

(Application filed May 5, 1902.)

2 Sheets—Sheet 2.

WITNESSES:

Wm A. Skinkle

A. E. Merkel.

INVENTOR:

C. H. Benton by his attorney,

J. D. Fay

UNITED STATES PATENT OFFICE.

CHARLES HORACE BENTON, OF CLEVELAND, OHIO.

ENGINE.

SPECIFICATION forming part of Reissued Letters Patent No. 12,009, dated July 15, 1902.

Original No. 667,760, dated February 12, 1901. Application for reissue filed May 5, 1902. Serial No. 105,919.

*To all whom it may concern:*

Be it known that I, CHARLES HORACE BENTON, of Cleveland, in the county of Cuyahoga and State of Ohio, have invented a new and useful Improvement in Engines; and I do hereby declare the following to be a full, clear, and exact description thereof.

My invention relates to steam-engines in which the piston and the reciprocating parts therewith connected are single-acting, and the journals and bearings of the said reciprocating parts thus have their wear automatically taken up; and the object of this invention is to obtain an engine with a single crank and ordinary piston-valves, but without independent valve-gear, which shall have an impulse of steam in each direction per revolution instead of in only one direction, as in ordinary single-acting engines, all substantially as shown and described, and particularly pointed out in the claims. To accomplish these purposes, I have two sets of reciprocating parts, each set having one or more pistons generally moving together, but having a slight differential motion relatively to each other produced by the different manner of their connection to the crank. One of these sets is always in tension, the other set always in thrust, the set in tension having piston-valves attached which serve to distribute steam to the piston or pistons of the set in thrust and the set in thrust having piston-valves attached to distribute steam to the piston or pistons of the set in tension.

Figure 1:
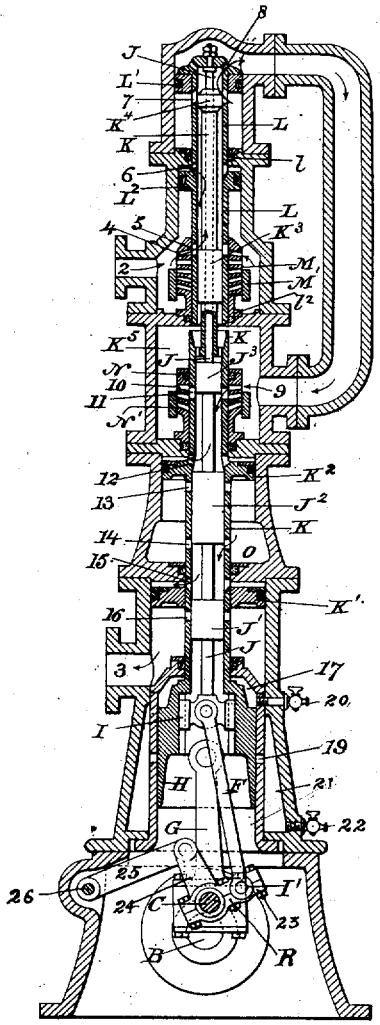
Figure 2:
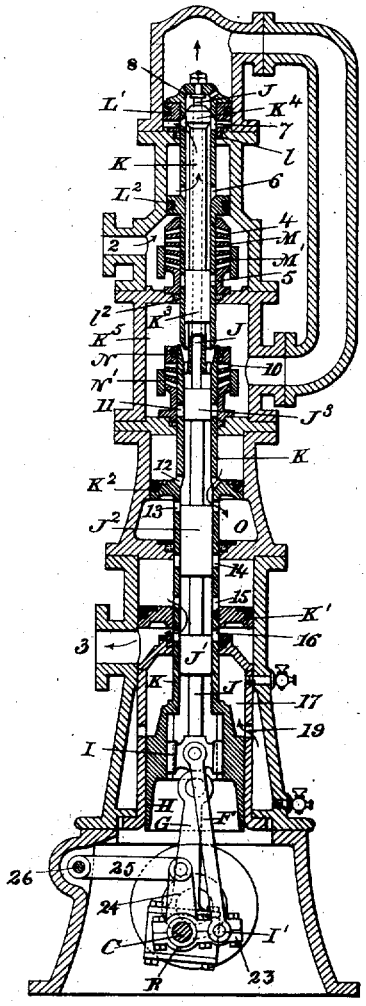
Figure 3:
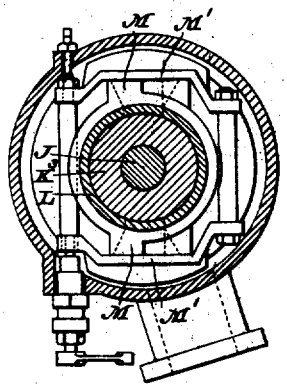
Figure 4:
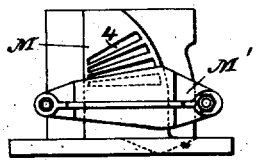

In the accompanying drawings, Figure 1 is a longitudinal sectional elevation of a quadruple expansion-engine with the pistons and valves at the beginning of the downstroke, and Fig. 2 is a like elevation with said parts at the beginning of the upstroke. The engine will only start from the position of Fig. 2. Fig. 3 is a transverse section through the upper steam-chest, showing in plan one of the steam-inlet cut-offs; and Fig. 4 is a side elevation of the steam-inlet cut-off.

High-pressure and second expansion pistons, respectively $L^2$ and $L'$, are supported on the hollow piston rod or tube L, working in packed stuffing-boxes $l$ and $l^2$ and are connected by tension-rod J, fixed in the top of said tube at its upper end, to the cross-head I at its bottom, and thence by link F and the pin $I'$ on arm 23 of rocking lever R to the crank-pin C of shaft B. Third and fourth expansion-pistons, respectively $K^2$ and $K'$, are connected by means of the hollow piston rod or tube K and two connecting-rods G, one of which only is shown, to the crank-pin C through the cross-head H. The hollow piston-rod K has attached to it valves $K^3$ and $K^4$, which effect the distribution of steam to the pistons $L^2$ and $L'$. The tension-rod J has attached to it valves $J'$ $J^2$ $J^3$, which effect the distribution of steam to the third and fourth expansion-pistons $K^2$ and $K'$. The tension-rod J has a cross-head I, working in guides placed within the cylindrical cross-head H and between the two connecting-rods G. All the valves are packed in their tubes.

The steam-chest 2 is openly connected with the boiler, and the boiler-steam is in constant pressure against the under side of the high-pressure piston $L^2$. The hollow piston-rod L has a tubular extension which reciprocates through the stationary sleeve M, which has through each side a series of ports 5, controlled by the sliding cut-off plates $M'$, and constitutes a gridiron governing-gear or steam-inlet, which is controlled by the sliding cut-off plates $M'$. This tubular extension has ports 5, which correspond with the stationary ports 4 of the cut-off inlet M.

In Fig. 1 the valve $K^3$ is descending relatively to the piston $L^2$. This opens the ports 5 and admits steam through the ports 6 into the first cylinder above the piston $L^2$. On the downward stroke, therefore, the piston $L^2$ is balanced by the full steam-pressure above the piston $L^2$ and the constant boiler-pressure below it. Toward the bottom of the stroke the valve $K^3$ rises and closes the supply-ports 5. This point at which the supply-ports 5 are closed by the valve $K^3$ is fixed, the variable cut-off being effected by the number of stationary ports 4 in sleeve M, which are opened or closed by the cut-off plates $M'$. At the bottom of the stroke the valve $K^4$ also is rising and opens the ports 7. The steam, therefore, on the upstroke passes from above the piston $L^2$ into the second cylinder below the piston $L'$, which is of larger area than the piston $L^2$, but attached to the same tubular piston-rod L. (See Fig. 2.) At the beginning of the next downward stroke the valve $K^4$ is falling and opens the ports 7 and allows the steam to pass through the ports 8 into the passage 9, and so to the intermediate receiver $K^5$, and do their work in tension on the upstroke. The net pressure on $L^2$ is upward on the upstroke, and as it has boiler-pressure on its under side and the working pressure of the second expansion-piston on its upper side the net pressure on L′ is also upward, as it has the receiver-pressure on its upper side and the exhaust from the high-pressure $L^2$ on its under side. The two pistons $L^2$ and L′ are thus in equilibrium on the downstroke and do their work in tension on the upstroke. In the receiver $K^5$ is a second sleeve N, with ports 10 and cut-off valves 11, similar to sleeve M in the steam-chest 2. In Fig. 1 the steam is entering through the stationary ports 10 of the sleeve N above the cut-off plates N′ and passing through the ports 11 of the hollow piston-rod K and the ports 12 into the third cylinder above the piston $K^2$. Toward the bottom of the stroke the valve $J^3$ falls and closes the ports 11, and at the bottom of the stroke the valve $J^2$ drops below the ports 13 and on the upstroke allows the steam to pass below the piston $K^2$, through the ports 12 and 13, into the receiver O. At the beginning of the next downward stroke the steam in the receiver O passes through the ports 14 and 15 into the fourth cylinder above the piston K′. The steam on this piston acts in the same way as on the piston $K^2$, except that when it passes beneath the piston it passes through ports 16 direct to the exhaust 3 instead of into a receiver. The two pistons $K^2$ and K′ are thus in equilibrium on the upstroke and do their work in thrust on the downstroke. On the downstroke the piston L′ is in equilibrium, as its two sides are in communication, and the piston $L^2$, until the steam is cut off, is in equilibrium between the boiler-steam on the bottom and the admitted steam on the top; but after the steam is cut off the steam above the piston $L^2$ expands and the preponderating pressure is upward. This excess upward pressure caused by the boiler-steam toward the bottom of the stroke takes up the downward momentum of the tension system and prevents its knocking at the bottom of the stroke. On the upward stroke the pistons $K^2$ and K′ are in equilibrium, as their opposite sides are in communication, and in order to prevent the upward momentum from causing a knock at the top of the stroke I introduce a cylindrical air-chamber 17, surrounding the top of the cylindrical cross-head H. At the bottom of the stroke the cross-head H sinks beneath the ports 19 and allows the air at atmospheric pressure to get above the cross-head. On the upward stroke these ports are closed and the air is compressed above the cross-head, this air serving to arrest the upward momentum of the thrust system. This prevents possible knocking or pounding of the reciprocating parts at the ends of the strokes and evenly balances the movements.

When starting the engine, the air above cross-head H may be allowed to escape by opening petcock 20, which is again closed when the engine is in motion. A petcock 22, leading into space 21, may be opened either to draw off water of condensation or to maintain atmospheric pressure in space 21.

As a peculiarity of construction it will be noticed that the valves for the upper high-pressure pistons L′ and $L^2$ are connected positively to act with the tube K, which carries low-pressure pistons K′ and $K^2$, while the valves for the low-pressure pistons are connected to act positively with the high-pressure pistons L′ and $L^2$. The same principle of operation substantially would be obtained by discarding pistons L′ and K′ and rearranging the mechanism to use only pistons $L^2$ and $K^2$. In this case the steam from the top of piston $L^2$ instead of first expanding under the piston L′, which is now omitted, would pass directly by passage 9 to receiver $K^5$ and on the reverse stroke would receive its second expansion and act downward on piston $K^2$. The steam from $K^2$ would then pass directly to the exhaust instead of being retained in a receiver O for another expansion.

The lever R is mounted to rock on crank C, the arm 23 of this lever being connected by pin I′ to connecting-rod F, while its arm 24 is connected to vibrating link 25, pivoted at 26 in the frame. As a result of this arrangement while the end of the connecting-rod G moves in the usual crank circle the end of the connecting-rod F moves in an oval curve. The upper ends of these connecting-rods are thus given a differential motion, so that the extension of each pair of pistons is caused to properly actuate the valves governing the movement of the other pair of pistons.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. An engine comprising a high-pressure and a low-pressure cylinder arranged in tandem, an independent piston in each cylinder, a pressure-inlet to the high-pressure cylinder, an external passage leading from the exhaust end of the high-pressure cylinder and communicating with the inlet end of the low-pressure cylinder, distribution-valves controlling the high and low pressure cylinders, a crank-shaft and crank, and separate means connecting each piston to said crank.

2. An engine comprising a high-pressure and a low-pressure cylinder arranged in tandem, an independent piston in each cylinder, a pressure-inlet to the high-pressure cylinder, an external passage leading from the exhaust end of the high-pressure cylinder and communicating with the inlet end of the low-pressure cylinder, central-distribution slide-valves controlling the high and low pressure cylinders, a crank-shaft and crank, and separate means connecting each piston to said crank.

3. An engine comprising a high-pressure and a low-pressure cylinder arranged in tandem, an independent piston in each cylinder, a pressure-inlet to the high-pressure cylinder, an external passage leading from the exhaust end of the high-pressure cylinder and communicating with the inlet end of the low-pressure cylinder, central-distribution slide-valves controlling the high and low pressure cylinders, the valve of each cylinder connected to the piston of the other cylinder, a crank-shaft and crank, and separate means connecting each piston to said crank.

4. An engine comprising a high-pressure and a low-pressure cylinder arranged in tandem, an independent piston in each cylinder, a pressure-inlet to the high-pressure cylinder, an external passage leading from the exhaust end of the high-pressure cylinder and communicating with the inlet end of the low-pressure cylinder, central-distribution slide-valves controlling the high and low pressure cylinders, an extension from the piston of each cylinder connected to the valve controlling the other cylinder, a crank-shaft and crank, and separate means connecting each piston to said crank.

5. An engine comprising a high-pressure and a low-pressure cylinder arranged in tandem, an independent piston in each cylinder, a pressure-inlet to the high-pressure cylinder, an external passage leading from the exhaust end of the high-pressure cylinder and communicating with the inlet end of the low-pressure cylinder, central-distribution slide-valves controlling the high and low pressure cylinders, independent valves controlling the inlets to the high and low pressure cylinders, a crank-shaft and crank, and separate means connecting each piston to said crank.

6. An engine comprising a high and a low pressure cylinder arranged in tandem, an independent piston in each cylinder, a steam-chest between the cylinders having a central sleeve with steam-ports, an external passage leading from the exhaust end of the high-pressure cylinder and communicating with the inlet end of the low-pressure cylinder, a central-distribution slide-valve controlling the high-pressure cylinder and arranged within said sleeve, an extension from the piston of the high-pressure cylinder arranged between said valve and sleeve and having ports in position to register with those of said sleeve, a cut-off valve in position to control the ports of said sleeve, a distribution-valve controlling the low-pressure cylinder, a crank-shaft and crank, and separate means connecting each piston to said crank.

7. An engine comprising a high and a low pressure cylinder arranged in tandem, an independent piston in each cylinder, a steam-chest between the cylinders, having a central sleeve with steam-ports, an external passage leading from the exhaust end of the high-pressure cylinder and communicating with the inlet end of the low-pressure cylinner, a central-distribution slide-valve controlling the high-pressure cylinder and arranged within said sleeve, an extension from the piston of the high-pressure cylinder arranged between said valve and sleeve and having ports in position to register with those of said sleeve, a cut-off valve in position to control the ports of said sleeve, a distribution-valve controlling the low-pressure cylinder, a separate valve controlling the inlet to the low-pressure cylinder, a crank-shaft and crank, and separate means connecting each piston to said crank.

8. An engine comprising a high and a low pressure cylinder arranged in tandem, an independent piston in each cylinder, a pair of steam-chests between the cylinders, each having a central sleeve with steam-ports, an external passage leading from the exhaust end of the high-pressure cylinder and communicating with the steam-chest of the low-pressure cylinder, central-distribution slide-valves controlling the high and low pressure cylinders and arranged within said sleeves, an extension from the piston of each cylinder arranged between the distribution-valve and sleeve of the corresponding steam-chest and having ports in position to register with those of said sleeve, separate cut-off valves in position to control the ports of said sleeves, a crank-shaft and crank, and separate means connecting each piston to said crank.

9. An engine comprising a high-pressure and a low-pressure cylinder arranged in tandem, an independent piston in each cylinder, a pressure-inlet to the high-pressure cylinder, an external passage leading from the exhaust end of the high-pressure cylinder and communicating with the inlet end of the low-pressure cylinder, central-distribution slide-valves controlling the high and low pressure cylinders, the valves of each cylinder connected to the piston of the other cylinder, a crank-shaft and crank, and separate means connecting each piston to said crank, arranged to give said pistons and valves a differential motion with respect to each other.

10. A steam-engine comprising a high-pressure and a low-pressure cylinder arranged in tandem, an independent piston in each cylinder, a steam-chest between said cylinders and in open communication with the high-pressure cylinder, whereby a constant steam-pressure is maintained on one face of the piston in the high-pressure cylinder, an air-cushion arranged in position to act as a buffer to the piston of the low-pressure cylinder, a crank-shaft and crank, and separate means connecting each piston to said crank.

11. In a multiple-piston engine, a series of cylinders arranged in axial relation to each other and a series of separate motive pistons of different areas therein arranged in oppositely-driving pairs, a series of distribution-valves connected in pairs and operating centrally as to said pistons and having a rigid connection with one pair of said pistons and an independent sliding contact within the other pair of pistons, substantially as described.

12. In a steam-engine a series of axially-alined cylinders having a set of high-pressure motive pistons and a set of low-pressure motive pistons therein, and a steam-passage from the high-pressure-piston cylinders to the low-pressure-piston cylinders, separate tubes rigidly connecting said pistons in oppositely-driving pairs and having steam inlets and outlets, and valves in pairs arranged to reciprocate within said tubes and control said inlets and outlets and having each pair of said valves connected rigidly with one set of said pistons to move in time therewith and independently of the other set of pistons and valves, substantially as described.

13. In a steam-engine, a series of cylinders and a series of motive pistons of different areas arranged in axial alinement and in pairs and a separate tube connecting each pair of pistons independently of the other pair, said tubes having steam-ducts on each side of each piston, valves in pairs for each pair of pistons connected with and operated by the opposite driving-pistons, and means for operating the pairs of valves having differently-timed throws to open and close said steam-ducts, substantially as described.

14. In steam-engines of the multiple-piston type, a set of low-pressure motive pistons of different areas and a set of high-pressure pistons of different areas and separate cylinders therefor connected by a steam-passage, separate crank connections with differently-timed throws for said sets, valves centrally as to said pistons and the valves of one set having the same throw as the other set, said valves for the low-pressure pistons having a rigid operative connection with the high-pressure pistons and the valves for the high-pressure pistons having a rigid operative connection with the low-pressure pistons, substantially as described.

15. A steam-engine having a series of cylinders and pistons of different areas arranged in axial alinement and having said pistons connected in pairs to drive in opposite directions, one pair consisting of high-pressure pistons rigidly connected and the other of low-pressure pistons rigidly connected and valves carried by each pair of pistons to operate centrally in the connection of the opposite pair of pistons, and steam-inlets and governing mechanism for each pair of pistons independently of said valves, substantially as described.

16. In a steam-engine, a series of cylinders and pistons of different areas divided into pairs, each pair of pistons having valves connected therewith to operate centrally within the opposite pair of pistons, separate crank connections having differentially-arranged throws for each pair of pistons and valves, ducts to convey the steam from one piston to the other, and separate steam-inlet-governing mechanism for each pair of cylinders and its pistons, substantially as described.

17. A series of steam-cylinders axially arranged and having a set of connected high-pressure pistons and a set of connected low-pressure pistons therein, valves carried by each set of pistons to control the flow of steam between the pistons of the opposite driving set, a duct to lead the steam from one set of pistons to the other set whereby a direct action of the steam is obtained in opposite directions successively, and separate steam-governing mechanism at the inlets of each set of pistons, substantially as described.

18. In an engine as described, a set of cylinders and motive pistons of different areas, the smaller piston located to be subject to constant pressure from the boiler on its under side and the larger piston subject to pressure on its top from steam which has passed the smaller piston, crank connections having differently-timed throws for each piston, and a valve for each piston rigidly connected with and operated by the throw of the opposite moving piston, and separate steam-governing mechanism for said pistons, substantially as described.

19. In steam-engines, two sets of reciprocating motive pistons and cylinders therefor, one of which sets of pistons has a constant steam-cushion in one direction, and the other set a fluctuating air-cushion in the other direction, substantially as described.

20. In an engine, the axially-alined high-pressure and second expansion cylinders having pistons therein connected by a tube, low-pressure cylinders and the pistons therein, and a supporting-tube for said pistons having crank connections, steam-ducts in said tubes on each side of said pistons, valves on the upper part of the low-pressure-piston tube to control the flow of steam through said ducts about the high-pressure pistons, a tension-rod fixed to said high-pressure pistons having valves to control the flow of steam through the ducts about the low-pressure pistons, separate crank mechanism for said rod timed to work with the low-pressure-piston crank connections, a steam-passage from said second expansion-cylinder and piston to said low-pressure cylinder and pistons, and separate governing mechanism at the steam-inlets of the high and low pressure cylinders and pistons, substantially as described.

In testimony whereof I have hereunto set my hand this 28th day of April, A. D. 1902.

CHARLES HORACE BENTON.

Witnesses:
A. E. MERKEL,
D. T. DAVIES.